United States Patent
Hao et al.

(10) Patent No.: US 10,503,144 B2
(45) Date of Patent: Dec. 10, 2019

(54) ANOMALY DETECTION WITH CORRELATION COEFFIECIENTS

(71) Applicant: Applied Materials, Inc., Santa Clara, CA (US)

(72) Inventors: Heng Hao, Fremont, CA (US); James Tom Pye, Santa Clara, CA (US); Sreekar Bhaviripudi, Sunnyvale, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 15/792,436

(22) Filed: Oct. 24, 2017

(65) Prior Publication Data

US 2019/0121317 A1    Apr. 25, 2019

(51) Int. Cl.
*G05B 19/4063* (2006.01)
*G05B 19/18* (2006.01)
*G05B 19/418* (2006.01)

(52) U.S. Cl.
CPC ....... *G05B 19/4063* (2013.01); *G05B 19/188* (2013.01); *G05B 19/4184* (2013.01); *G05B 2219/14039* (2013.01); *G05B 2219/31294* (2013.01); *G05B 2219/45031* (2013.01)

(58) Field of Classification Search
None
See application file for complete search history.

(56) References Cited

U.S. PATENT DOCUMENTS

| | | | | |
|---|---|---|---|---|
| 8,744,813 B2* | 6/2014 | Lacaille | ............ | G05B 23/0254 702/183 |
| 2003/0009091 A1* | 1/2003 | Edgar, Jr. | ............ | A61B 5/14551 600/323 |
| 2003/0061212 A1* | 3/2003 | Smith | ............... | G06Q 10/06 |
| 2003/0208286 A1* | 11/2003 | Abercrombie | ....... | G06Q 10/043 700/31 |
| 2006/0015294 A1* | 1/2006 | Yetter, Jr. | ............ | G05B 23/0254 702/183 |
| 2006/0095232 A1* | 5/2006 | Purdy | ................ | G05B 23/0221 702/185 |
| 2007/0092975 A1* | 4/2007 | Potyrailo | .......... | B01L 3/502715 436/169 |
| 2011/0276828 A1 | 11/2011 | Tamaki et al. | | |
| 2012/0166142 A1* | 6/2012 | Maeda | ............... | G05B 23/0227 702/185 |

(Continued)

*Primary Examiner* — Ziaul Karim
(74) *Attorney, Agent, or Firm* — Patterson + Sheridan LLP (57) ABSTRACT

A method for detecting an anomaly in sensor data generated in a substrate processing apparatus is disclosed herein. A plurality of data sets is received. A first data set from a first sensor and second data set from a second sensor are selected. The first second sensors are defined as a sensor pair. A reference correlation is generated by selecting a subset of values in each data set for each of the first and second data sets. A difference of remaining data correlation outside the subset of values in each data set to the reference correlation is normalized. The normalized data set is filtered to smooth the normalized difference to avoid isolated outliers with high chance of false positive candidates. One or more anomalies are identified. Process parameters of the substrate processing apparatus are adjusted, based on the one or more identified anomalies from the filtered data set.

20 Claims, 5 Drawing Sheets

(56) References Cited

U.S. PATENT DOCUMENTS

2013/0304710 A1* 11/2013 Nachev ................ G06K 9/6284
 707/690
2017/0109646 A1* 4/2017 David .................... G03F 7/705

* cited by examiner

ANOMALY DETECTION WITH CORRELATION COEFFIECIENTS

BACKGROUND

Field

Embodiments of the present disclosure generally relates to semiconductor manufacturing, and, more specifically, embodiments of the present disclosure relate to anomaly detection in sensor data retrieved during semiconductor processing.

Description of the Related Art

Manufacturing of electronic devices typically involves performing a sequence of procedures with respect to a substrate such as a silicon substrate, a glass plate, etc. (Such substrates may also be referred to as wafers, whether patterned or unpatterned.) These steps may include polishing, deposition, etching, photolithography, heat treatment, and so forth. Usually a number of different processing steps may be performed in a single processing system or "tool" which includes a plurality of processing chambers. During processing, each chamber in which a procedure is carried out may include a plurality of sensors, with each sensor configured to monitor a predefined metric relating to substrate processing.

Anomaly detection in sensor trace data aids in assessing the overall health of the chamber in which a substrate processing procedure is carried forth. Some technique for anomaly detection in sensor trace data is recipe dependent, i.e., a different method for detecting anomalies in sensor trace data is needed based on the tool used and the process run. As a result, different techniques are needed, which can be costly and time consuming to develop. Therefore, there is a continual need for an improved method of detecting anomalies in sensor data retrieved during semiconductor processing.

SUMMARY

Embodiments described herein generally relate to a method, system, and computer readable medium for detecting an anomaly is sensor data generated in a substrate processing apparatus is disclosed herein. A plurality of data sets is received. Each data set corresponds to a sensor in a plurality of sensors disposed in a substrate processing apparatus. Each sensor is configured to monitor a respective substrate processing metric. A first data set is selected. The first data set corresponds to a first substrate processing metric monitored by the first sensor disposed in the substrate processing apparatus. A second data set is selected. The second data set corresponding to a second substrate processing metric monitored by the second sensor disposed in the substrate processing apparatus. The first sensor and the second sensor are defined as a sensor pair. A reference correlation is generated by selecting a subset of values in each data set for each of the first and second data sets. Difference of the remaining data outside of the subset of values compared to the reference in each data set is z-normalized to obtain a z-normalized data set The z-normalized data set is filtered to remove one or more outliers from the z-normalized data set to generate a filtered data set. One or more anomalies are identified in the filtered data set. Process parameters of the substrate processing apparatus are adjusted, based on the one or more identified anomalies from the filtered data set.

DETAILED DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

It is to be noted, however, that the appended drawings illustrate only exemplary embodiments of this invention and are therefore not to be considered limiting of its scope, for the invention may admit to other equally effective embodiments.

DETAILED DESCRIPTION

Figure 1:
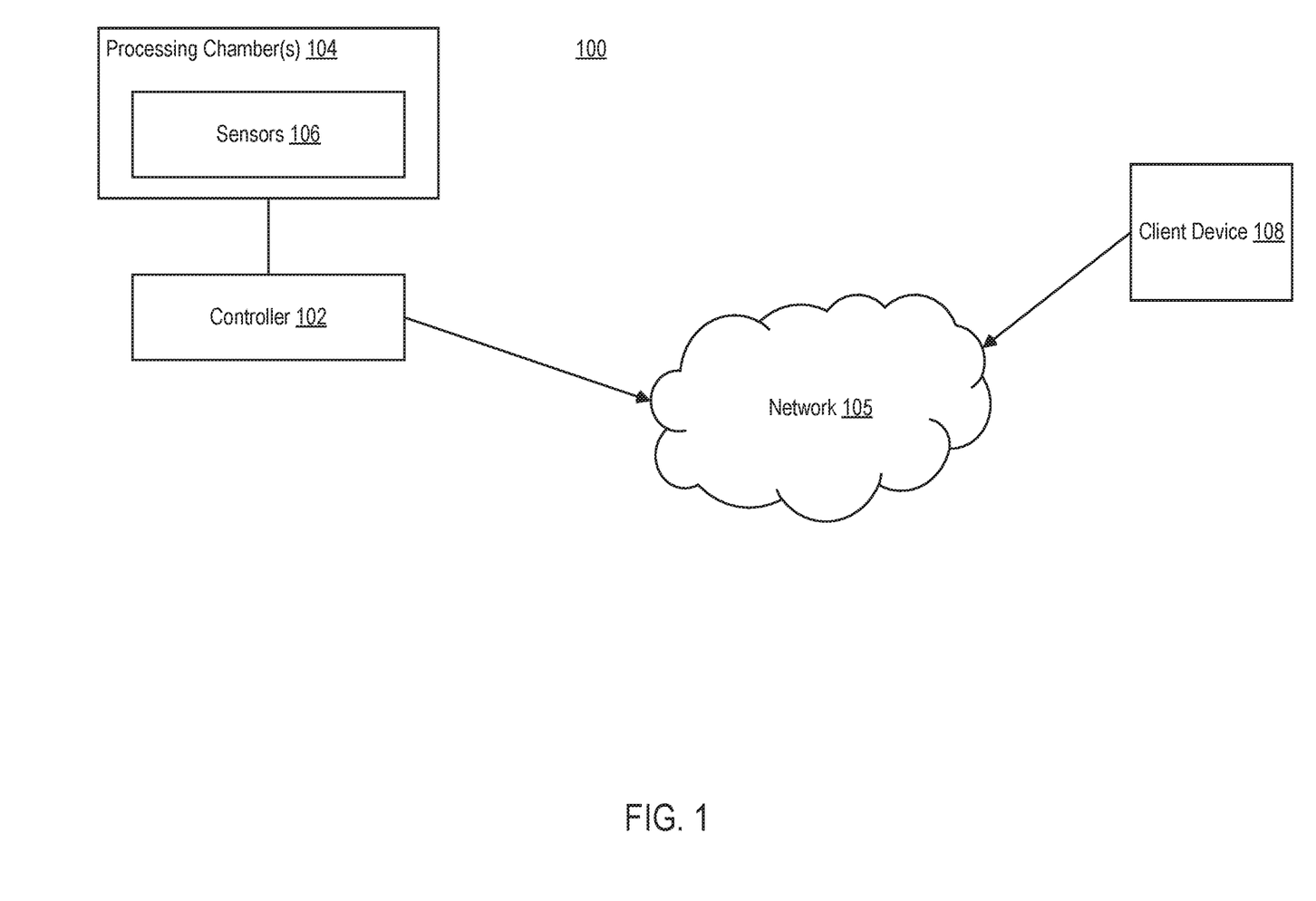
FIG. 1 illustrates a computing environment, according to one embodiment.

FIG. 1 illustrates a computing environment 100, according to one embodiment. The computing environment 100 includes a controller 102 and a client device 108. The controller 102 communicates with the client device 108 over network 105. The controller 102 may be a controller in use with one or more substrate processing chambers 104. For example, the controller 102 may be a controller that aids in controlling the process parameters of each substrate processing chamber 104. Each processing chamber 104 has one or more sensors 106 positioned therein. Each sensor 106 is configured to monitor a metric associated with processing of the substrate. For example, a given processing chamber 104 may be an etch chamber having at least two sensors 106. A first sensor 106 may be configured to monitor a flow rate of gas coming into the processing chamber 104, while a second sensor 106 may be configured to measure a flow rate of the gas exiting the processing chamber 104. The sensors 106 provide the measurements of each metric to the controller 102 for further processing.

Client device 108 communicates with the controller 102 over the network 105. For example, controller 102 may transmit the sensor data collected from each sensor 106 to the client device 108 for further analysis. In some embodiments, client device 108 is configured to identify anomalies in the received sensor data such that subsequent substrate processing processes may be adjusted. Detection of anomalies in the sensor data aids in assessing the overall health of the processing chamber 104, i.e., how well the processing chamber 104 is performing. Specifically, anomaly detection in the sensor data aids in diagnosing symptoms of the processing chamber 104. In some techniques, anomaly detection suffers from being recipe dependent, resulting in many false positives. Additionally, these detection methods are typically slow to scale to larger data sets, and are expensive to maintain. Client device 108 is configured to provide an improved anomaly technique that result in efficient identification of anomalies in sensor data.

Figure 2:
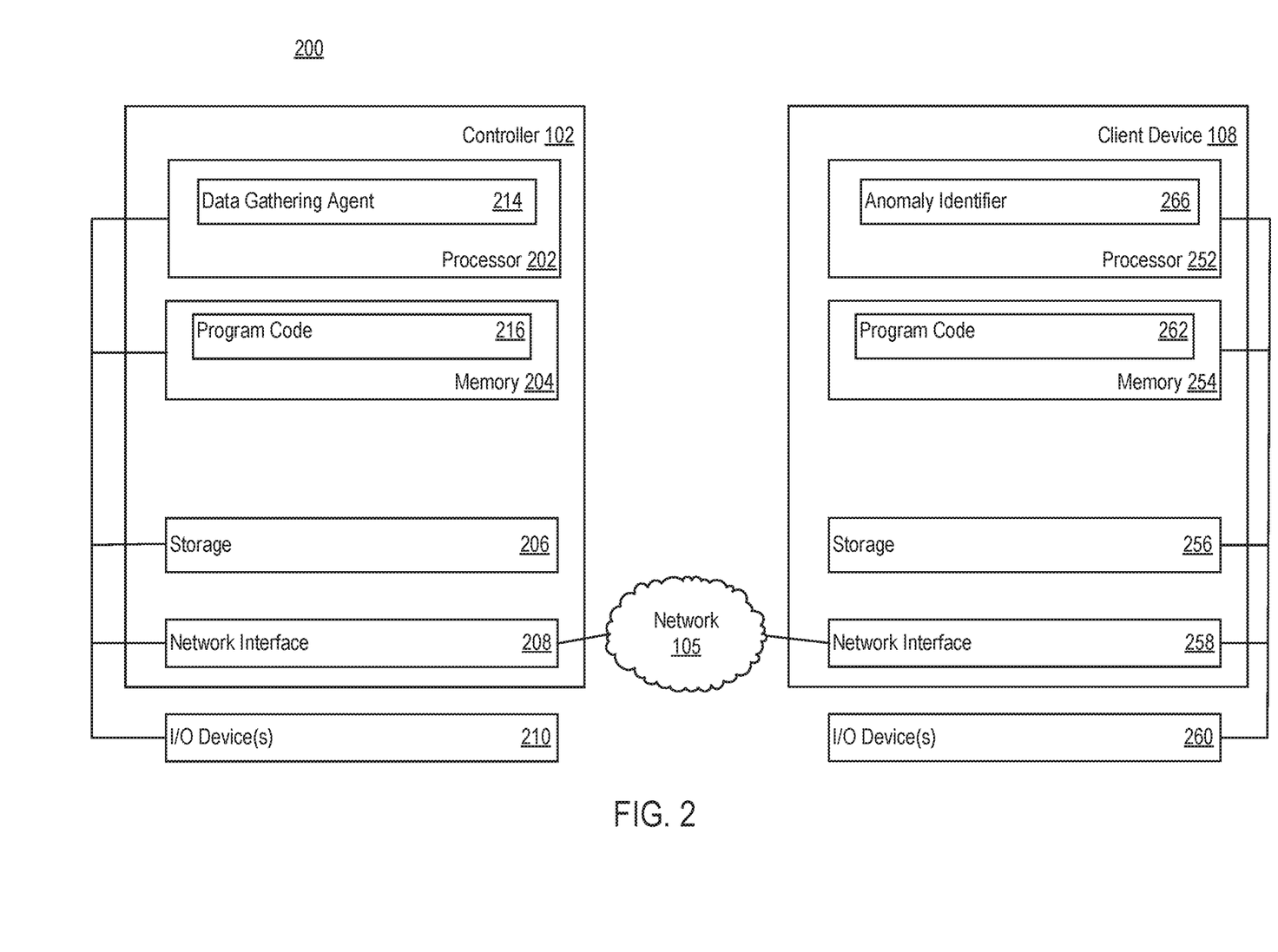
FIG. 2 illustrates a detailed computing environment, according to one embodiment.

FIG. 2 illustrates a detailed computing environment 200 illustrating the controller 102 and the client device 108 in more detail. As shown, the controller 102 includes a processor 202, memory 204, storage 206, and network interface 208. In some embodiments, the controller 102 further includes one or more I/O devices 210 coupled thereto. The processor 202 is included to be representative of a single processor, multiple processors, a single processor having multiple processing cores, and the like. The processor 202 may include a data gathering agent 214. The data gathering agent 214 is configured to receive sensor data from each of the one or more sensors 106. In some embodiments, data gathering agent 214 generates a data set for each sensor 106. For e.g., data gathering agent 214 generates a first data set for the first sensor, and data gathering agent 214 generates a second data set for the second sensor.

The memory 204 includes program code 216. The program code 216 is configured to carry out the instructions of the end user for substrate processing. For example, an end user may provide the controller 102 with instructions regarding the process parameters of a certain substrate processing process. In another example, the program code 216 may further include instructions for generating each data set for each sensor 106.

The storage 206 may be disk drive storage. Although shown as a single unit, the storage 206 may be a combination of fixed and/or removable storage devices, such as fixed disk drives, removable memory cards, optical storage, network attached storage (NAS), or storage-area-network (SAN). The network interface 208 may be any type of network communications allowing the controller to communicate with other computers via the network 105, such as, for example, client device 108.

Client device 108 includes a processor 252, a memory 254, storage 256, and network interface 258. The processor 252 retrieves and executes programming instructions, such as program code 262, stored in memory 254. For example, the program code 262 is configured to carry out the method discussed below, in conjunction with FIG. 3, of identifying anomalies in the received sensor data. The processor 252 is included to be representative of a single processor, multiple processors, a single processor having multiple processing cores, and the like. As shown, the processor 252 includes an anomaly identifier 266. The anomaly identifier 266 is configured to identify anomalies is sensor data received from controller 102.

The storage 256 may be disk drive storage. Although shown as a single unit, the storage 256 may be a combination of fixed and/or removable storage devices, such as fixed disk drives, removable memory cards, optical storage, network attached storage (NAS), or storage-area-network (SAN). The network interface 258 may be any type of network communications allowing the controller to communicate with other computers via the network 105, such as, for example, controller 102.

Figure 3:
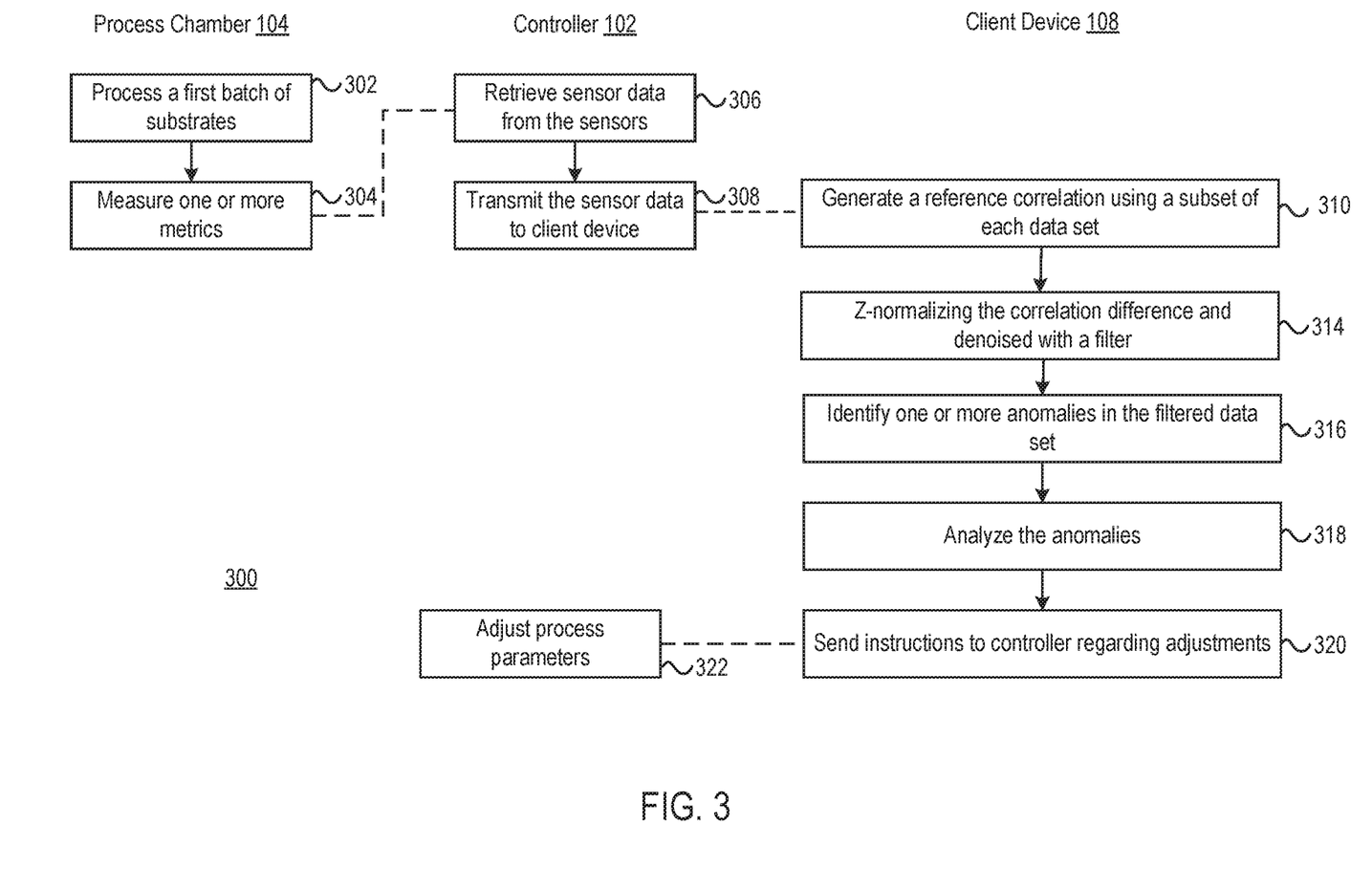
FIG. 3 is a flow diagram illustrating a method for detecting an anomaly in retrieved sensor data, according to one embodiment.

FIG. 3 is a flow diagram of a method 300 for detecting an anomaly in retrieved sensor data, according to one embodiment. At block 302, a first batch of substrates undergoes a process in a first process chamber. A batch may be user defined. In one embodiment, a batch may comprise a cassette of substrates. In another embodiment, a batch may comprise a lot of substrates comprising multiple cassettes of substrates. The first process chamber may be any type of semiconductor processing chamber. For example, the first process chamber may be any type of semiconductor processing chamber commercially available from Applied Materials, Inc. of Santa Clara, Calif., such as, but not limited to, etch, chemical vapor deposition, physical vapor deposition, implant, epitaxy, etc. It is contemplated that processing chambers available from other manufacturers may alternatively be utilized. The first process chamber includes one or more sensors. Each of the one or more sensors is configured to monitor a predefined metric (as set forth by a user). For example, each sensor may be configured to monitor one of pressure, temperature, flow rate, and the like. For purposes of future examples discussed below, the first process chamber will include two sensors (hereinafter, a first sensor and a second sensor).

At block 304, one or more metrics are measured with the one or more sensors during processing. Continuing with the above example, a first sensor measures a first metric (e.g., rate of gas flow entering the processing chamber) and the second sensor measures a second metric (e.g., rate of gas flow exiting the processing chamber). The first sensor detects a first plurality of measurements related to the first metric. The second sensor detects a second plurality of measurements related to the second metric.

At block 306, controller 102 retrieves the sensor data from each of the one or more sensors. For example, data gathering agent 214 gathers the data related to the first metric stored in the first database from the first sensor, and data gathering agent 214 gathers the data related to the second metric stored in the second database from the second sensor.

At block 308, controller 102 transmits the retrieved sensor data to the client device 108. For example, controller 102 transmits the generated first data set corresponding to the first sensor and the generated second data set corresponding to the second sensor to the client device 108 for further analysis. At block 310, client device 108 receives the sensor data from the controller 102.

At block 310, client device 108 generates a reference correlation using a subset of each retrieved data set. When client device 108 receives the sensor data from the controller 102, continuing with the above example, the client device 108 receives a first set of sensor data and a second set of sensor data. Mathematically, this may be presented as:

$$S_1=\{x_i\}, S_2=\{y_i\},$$

where $x_i$ is a received measurement for each substrate i from i=1 . . . n, from the first sensor (i.e., $S_1$), and where $y_i$ is a received measurement for each substrate i from i=1 . . . n, from the second sensor (i.e., $S_2$), and n is the total number of substrates processed in the batch of substrates.

Figure 4:
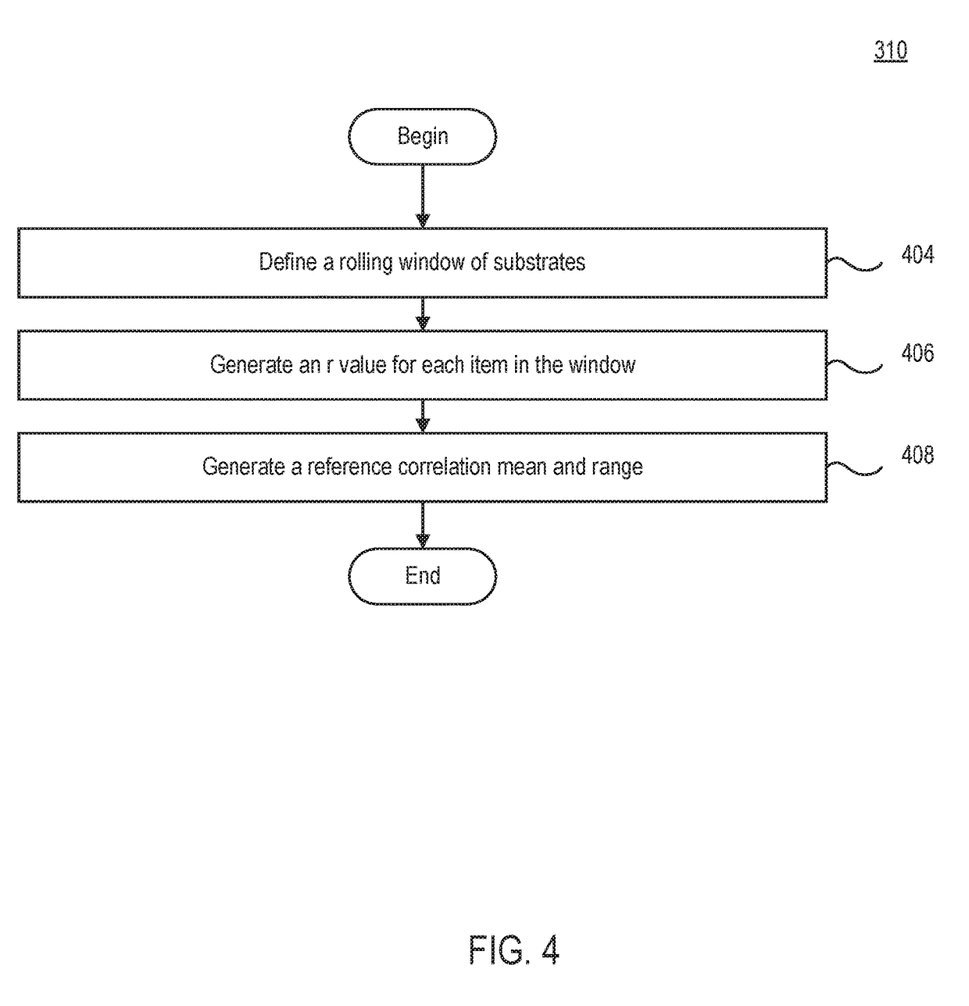
FIG. 4 is a flow diagram a block from the method of FIG. 3, according to one embodiment.
Figure 5:
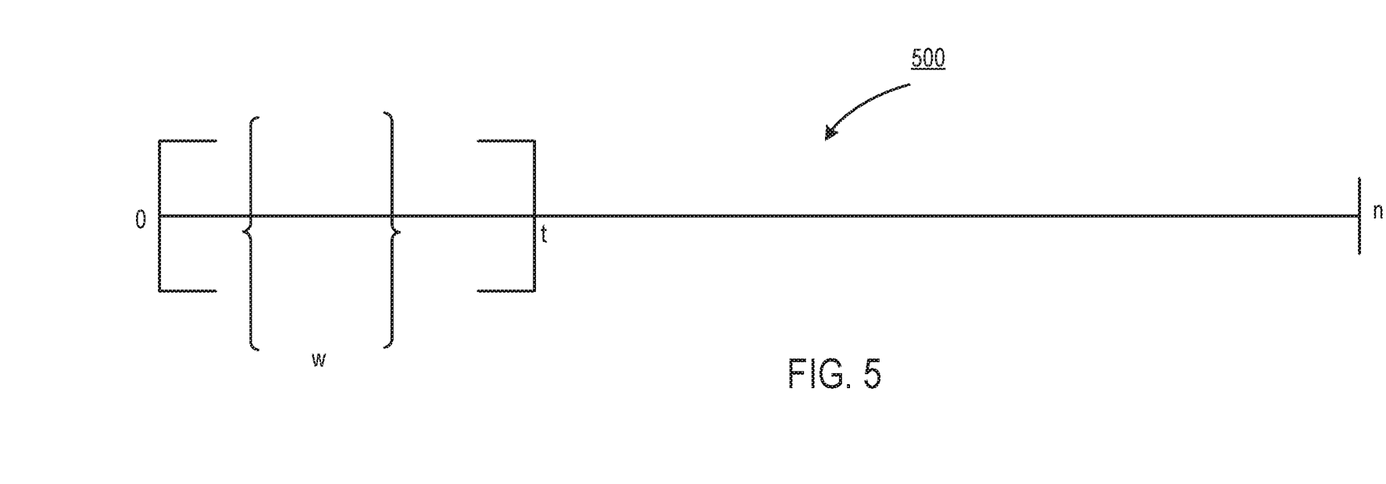
FIG. 5 is a logical diagram of FIGS. 3 and 4, illustrating a timeline, according to one embodiment.

FIG. 4 illustrates the block 310 of FIG. 3 above in more detail, according to one embodiment. Client device 108 first selects a reference run from the set of substrates processed. For example, FIG. 5 visually illustrates steps of generating the reference correlation. FIG. 5 includes a timeline 500 of each substrate processed in the first processing chamber. For example, timeline 500 illustrates that n substrates have been processed. When selecting a reference run, the client device 108 selects a subset from the overall set of n substrates. Using the example in FIG. 4, the reference run is defined as the subset of t substrates from substrate one ($\sigma_1$) to substrate t ($\sigma_t$).

At block 404, within the subset of t substrates, the client device 108 defines a rolling window, w, of substrates. For example, within subset of substrates $\{\sigma_a \ldots \sigma_t\}$, client device selects a smaller subset of substrates $\{\sigma_a \ldots \sigma_b\}$, where a, b $\in \{\sigma_1 \ldots \sigma_t\}$ and b=a+w. For each smaller subset of substrates, client device 108 calculates a reference correlation coefficient. For example, assume that the subset of t substrates includes 100 substrates, from $\{\sigma_1 \ldots \sigma_{100}\}$. Within that subset of t substrates, client device 108 selects a range of 30 substrates. For example, client device 108 starts by selecting substrates $\sigma_1$-$\sigma_{30}$. At block 406, for this range of substrates, $\{\sigma_1 \ldots \sigma_{30}\}$, client device 108 calculates an r value that is directed to the reference correlation coefficient. The reference correlation coefficient, generally, is represented as:

$$r = \frac{\sum_{1}^{w}(x_i - \bar{x})(y_i - \bar{y})}{\sqrt{\sum_{1}^{w}(x_i - \bar{x})^2}\sqrt{\sum_{1}^{w}(y_i - \bar{y})^2}}$$

Continuing with the above example, to generate $r_1$, the equation would look as follows:

$$r_1 = \frac{\sum_{1}^{30}(x_i - \bar{x})(y_i - \bar{y})}{\sqrt{\sum_{1}^{30}(x_i - \bar{x})^2}\sqrt{\sum_{1}^{30}(y_i - \bar{y})^2}}$$

The client device 108 continues to generate $r_i$ in a rolling window, by sliding the range of w substrates back and forth within the subset of s substrates. For example, to generate $r_2$, the equation may look as follows:

$$r_2 = \frac{\sum_{2}^{31}(x_i - \bar{x})(y_i - \bar{y})}{\sqrt{\sum_{2}^{31}(x_i - \bar{x})^2}\sqrt{\sum_{2}^{31}(y_i - \bar{y})^2}}$$

At block 408, when each $r_i$ is calculated, client device 108 generates a reference correlation coefficient mean and reference coefficient range to be leveraged in subsequent blocks of FIG. 3.

To normalize the data associated with the substrates outside of the subset of t substrates, client device 108 selects a subset z of remaining substrates and calculates the reference correlation efficient for the subset z. In one embodiment, the cardinality of the subset of z substrates is equal to the cardinality of the subset of w substrates. Continuing with the above example, the cardinality of subset w was chosen to be 30; therefore, the cardinality of the subset of z substrates is also 30. Thus, the first subset of 30 substrates may be substrates $\sigma_{101}$-$\sigma_{130}$. For each subset z of substrates, the r value would be calculated similarly to block 310 above. For example, for the first set of 30 substrates, the r value may be calculated as follows:

$$r_{z_1} = \frac{\sum_{101}^{130}(x_i - \bar{x})(y_i - \bar{y})}{\sqrt{\sum_{101}^{130}(x_i - \bar{x})^2}\sqrt{\sum_{101}^{130}(y_i - \bar{y})^2}}$$

After the $r_z$ value is determined, client device 108 calculates the difference compared to the reference correlation efficient determined in block 310. For example:

if $r_i < \min(r_{ref})$ then diff=$r_i$-min($r_{ref}$)

if $r_i > \max(r_{ref})$ then diff=$r_i$-max($r_{ref}$)

else diff=0

Referring back to FIG. 3, at block 314, the client device 108 z-normalizes a correlation difference and then de-noised with a filter. The client device 108 z-normalizes the difference of sensor data outside of the subset t of substrates. For example, assume that the total number of substrates in the collected sensor data is 1000, and that the subset t of substrates includes the set of substrates $\{\sigma_1 \ldots \sigma_{100}\}$. Client device 108 would then z-normalize the data associated with substrates in the set $\{\sigma_{101} \ldots \sigma_{1000}\}$. The difference (diff) is then z-normalized. Mathematically, this may be described as:

$$Z_{diff(r_i)} = \frac{diff(r_i) - \text{mean}(diff(r_i))}{std(diff(r_i))}$$

The z-normalized correlation difference is de-noised/smoothened by defining a low frequency band path filter in the frequency space. In this way, the isolated correlation difference outlier can be filtered out. The process works as follows: first transfer the z normalized correlation difference of each substrate ($Z_{diff(r_i)}$, which is a function of i) into Fourier space by taking a Fourier transformation of $Z_{diff(r_i)}$ into FT($Z_{diff(r_i)}$), which is now a function of frequency ω. User could define a meaningful band path, in the frequency space. For example, if the user only interested in the difference that happens in 10 or more consecutive substrates, then the band path in the frequency space is [0, 10/N], where N is the total number of substrates. Mathematically, the relationship between the filtered Fourier transformed difference FFT($Z_{diff(r_i)}$) and the original Fourier transformed difference FT($Z_{diff(r_i)}$) is as follows:

$$FFT(Z_{diff(r_i)}) = FT(Z_{diff(r_i)}) \text{ if } 0 < \omega < \frac{10}{N} \text{ else } 0$$

Then the inverse Fourier transformation is performed on FFT($Z_{diff(r_i)}$) to the original space to produce a smoothed difference in the correlation SM($Z_{diff(r_i)}$). Filtering the sensor data aids in decreasing the noise that is typically associated with sensitive sensor data. Because the correlation method is sensitive to the pairwise different, without the filtering technique, the final anomaly score may be noisy, i.e. the final anomaly score may include too many false positives. The filtering de-noises the sensor data such that the high false positive rate is reduced.

At block 316, the client device 108 identifies one or more anomalies in the z-normalized and filtered data set. For example, an outlier may be defined as that value which exceeds a cutoff amount. The cutoff amount may be a predefined value or may be defined as:

$$C = \text{mean}(SM(Z_{diff(r_i)})) + 3 \cdot std(SM(Z_{diff(r_i)}))$$

Accordingly, based on the above definition of a cutoff amount, an anomaly is defined by that value, for which:

$$SM(Z_{diff(r_i)}) > C$$

where $r_j$ represents some element, j, in the filtered data set.

In another example, we can use the SM($Z_{diff(r_i)}$) as an anomaly score and assume a normal distribution of the anomaly score and transform the anomaly score to anomaly probability for each sensor pair calculated. To do the transformation, using a cumulative distribution function of normal distribution of the absolute value of the smoothed z-normalized difference $r_i$ returns an anomaly probability.

Optionally, at block 318, the client device 108 may analyze the determined outliers. For example, as discussed above, the client device 108 receives a plurality of data sets from a plurality of sensors positioned in a substrate processing apparatus. Client device 108 then selects two or more data sets for the above anomaly detection, and repeats the process on each permutation of two or more data sets. In some embodiments, to determine which sensors appear most problematic, client device 108 may count the sensors that appear in each anomaly detected. Accordingly, the client device 108 alerts a user of which sensors appear most frequently in the anomaly pairwise relations. In another embodiment, to determine which substrates were involved in an anomaly run, the client device 108 calculates an absolute sum of all the anomalies found for a sensor pair. Those absolute sums that exceed the cutoff amount signal to the user that the substrate during that run may be defective.

At block 320, the client device 108 may communicate with the controller 102, indicating how to modify the process parameters of the processing chamber. At block 322, controller 102 changes the process parameters accordingly.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present example also relates to an apparatus for performing the operations herein. This apparatus may be specially constructed for the illustrated purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system interconnect.

The structure for a variety of these systems will appear from the description above. In addition, the present examples are not described with reference to any particular programming language, and various examples may thus be implemented using a variety of programming languages.

As described in greater detail herein, embodiments of the disclosure provide a software application through which a user may access a first file storage location, such as a personal web page hosted by a server, on a remote device by a link accessed via a second graphical user interface. The user may upload and/or transfer media files from a second file storage location accessed via the second graphical user interface to the first file storage location. The link may allow a user to send a link via a data network that will allow the user to quickly log in and upload media files from the remote device, which accesses the link. As such, the media files accessible by the remote device may be transferred from the second storage location of the remote device to the first storage location.

While the foregoing is directed to embodiments described herein, other and further embodiments may be devised without departing from the basic scope thereof. For example, aspects of the present disclosure may be implemented in hardware or software or in a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (for example, read-only memory devices within a computer such as CD-ROM disks readable by a CD-ROM drive, flash memory, ROM chips or any type of solid-state non-volatile semiconductor memory) on which information is permanently stored; and (ii) writable storage media (for example, floppy disks within a diskette drive or hard-disk drive or any type of solid-state random-access semiconductor memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

While the foregoing is directed to embodiments of the present invention, other and further embodiments of the invention may be devised without departing from the basic scope thereof, and the scope thereof is determined by the claims that follow.

What is claimed is:

1. A method for detecting an anomaly in sensor data generated in a substrate processing apparatus, comprising:
   receiving a plurality of data sets, each data set corresponding to a sensor in a plurality of sensors disposed in a substrate processing apparatus, wherein each sensor is configured to monitor a respective substrate processing metric of a substrate during a processing run of the substrate;
   selecting a first data set corresponding to a first substrate processing metric monitored by a first sensor disposed in the substrate processing apparatus;
   selecting a second data set corresponding to a second substrate processing metric monitored by a second sensor disposed in the substrate processing apparatus, wherein the first sensor and the second sensor are defined as a sensor pair;

for each of the first and second data sets, generating a reference correlation by selecting a subset of values in each data set;

z-normalizing a difference of a remaining data correlation outside of the subset of values to the reference correlation;

filtering a z-normalized data set to smooth a z-normalized difference;

identifying one or more anomalies in the filtered z-normalized data set; and adjusting process parameters of the substrate processing apparatus, based on the one or more identified anomalies from the filtered z-normalized data set.

2. The method of claim 1, further comprising:

selecting a third data set corresponding to a third substrate processing metric monitored by a third sensor disposed in the substrate processing apparatus;

selecting a fourth data set corresponding to a fourth substrate processing metric monitored by a fourth sensor disposed in the substrate processing apparatus;

for each of the third and fourth data sets, generating a second reference correlation by selecting a subset of values in each z-normalized data set;

z-normalizing of remaining data correlation outside of the subset of values in each z-normalized data set to obtain a second z-normalized data set;

filtering a second z-normalized data set to smooth the z-normalized difference;

identifying one or more anomalies in the second filtered z-normalized data set; and adjusting process parameters of the substrate processing apparatus, based on the one or more identified anomalies from the filtered z-normalized data set.

3. The method of claim 1, wherein generating a reference correlation by selecting a subset of values in each data set, comprises:

generating a reference correlation coefficient for substrate measurement in the first and second data set.

4. The method of claim 3, wherein generating a reference correlation coefficient for substrate measurement in the first and second data set, comprises:

selecting a first subset of substrate measurements in the first and second data sets;

defining a first window of substrate measurements within the first subset of substrate measurements, wherein the first window of substrate measurements is smaller than the first subset of substrate measurements;

generating a reference correlation coefficient for the first window of substrate measurements;

shifting the first window of substrate measurements by an index to form a second window of substrate measurements; and generating a reference correlation coefficient for the second window of substrate measurements.

5. The method of claim 1, wherein z-normalizing the difference of the remaining data correlation outside of the subset of values to the reference correlation, comprises:

comparing the remaining data correlation outside of the subset of values to a reference correlation coefficient of the subset of values.

6. The method of claim 1, wherein filtering the z-normalized data set to remove one or more outliers from the z-normalized data set to generate a filtered data set, comprises:

applying a Fourier transform, a band filter, then an inverse Fourier transform to the z-normalized data set.

7. The method of claim 1, wherein identifying one or more anomalies in the filtered z-normalized data set, comprises:

comparing each item in the filtered z-normalized data set to a cutoff value; and responsive to determining that an item in the filtered z-normalized data set exceeds the cutoff value, flagging that item as an anomaly.

8. A system, comprising:

a processor; and a memory having instructions stored thereon, which, when executed by the processor, performs an operation for detecting an anomaly in sensor data generated in a substrate processing apparatus, the operation comprising:

receiving a plurality of data sets, each data set corresponding to a sensor in a plurality of sensors disposed in a substrate processing apparatus, wherein each sensor is configured to monitor a respective substrate processing metric;

selecting a first data set corresponding to a first substrate processing metric monitored by a first sensor disposed in the substrate processing apparatus;

selecting a second data set corresponding to a second substrate processing metric monitored by a second sensor disposed in the substrate processing apparatus, wherein the first sensor and the second sensor are defined as a sensor pair;

for each of the first and second data sets, generating a reference correlation by selecting a subset of values in each data set;

z-normalizing a difference of correlation to the reference correlation;

filtering a z-normalized data set to remove one or more outliers from the z-normalized data set to generate a filtered data set;

identifying one or more anomalies in the filtered z-normalized data set; and adjusting process parameters of the substrate processing apparatus, based on the one or more identified anomalies from the filtered z-normalized data set.

9. The system of claim 8, further comprising:

selecting a third data set corresponding to a third substrate processing metric monitored by a third sensor disposed in the substrate processing apparatus;

selecting a fourth data set corresponding to a fourth substrate processing metric monitored by a fourth sensor disposed in the substrate processing apparatus;

for each of the third and fourth data sets, generating a second reference correlation by selecting a subset of values in each data set;

z-normalizing a difference of a second correlation to the second reference correlation;

filtering a second z-normalized data set to remove one or more outliers from the second z-normalized data set to generate a second filtered z-normalized data set;

identifying one or more anomalies in the second filtered z-normalized data set; and adjusting process parameters of the substrate processing apparatus, based on the one or more identified anomalies from the filtered z-normalized data set.

10. The system of claim 8, wherein generating a reference correlation by selecting a subset of values in each data set, comprises:

generating a reference correlation coefficient for substrate measurement in the first and second data set.

11. The system of claim 10, wherein generating a reference correlation coefficient for substrate measurement in the first and second data set, comprises:
- selecting a first subset of substrate measurements in the first and second data sets;
- defining a first window of substrate measurements within the first subset of substrate measurements, wherein the first window of substrate measurements is smaller than the first subset of substrate measurements;
- generating a reference correlation coefficient for the first window of substrate measurements;
- shifting the first window of substrate measurements by an index to form a second window of substrate measurements; and
- generating a reference correlation coefficient for the second window of substrate measurements.

12. The system of claim 8, wherein normalizing the difference of correlation to the reference correlation, comprises:
- comparing the remaining reference correlation outside of the subset of values to a reference correlation coefficient of the subset of values.

13. The system of claim 8, wherein filtering the z-normalized data set to remove one or more outliers from the z-normalized data set to generate a filtered data set, comprises:
- applying a Fourier transform, a band filter, and an inverse Fourier transform to the z-normalized data set.

14. The system of claim 8, wherein identifying one or more anomalies in the filtered data set, comprises:
- comparing each item in the filtered data set to a cutoff value; and
- responsive to determining that an item in the filtered data set exceeds the cutoff value, flagging that item as an anomaly.

15. A non-transitory computer readable medium having instructions stored thereon, which, when executed by a processor, cause the processor to perform a method of detecting an anomaly in sensor data generated in a substrate processing apparatus, comprising:
- receiving a plurality of data sets, each data set corresponding to a sensor in a plurality of sensors disposed in a substrate processing apparatus, wherein each sensor is configured to monitor a respective substrate processing metric;
- selecting a first data set corresponding to a first substrate processing metric monitored by a first sensor disposed in the substrate processing apparatus;
- selecting a second data set corresponding to a second substrate processing metric monitored by a second sensor disposed in the substrate processing apparatus, wherein the first sensor and the second sensor are defined as a sensor pair;
- for each of the first and second data sets, generating a reference correlation by selecting a subset of values in each data set;
- normalizing a difference of correlation to the reference correlation;
- filtering a z-normalized data set to remove one or more outliers from the z-normalized data set to generate a filtered data set;
- identifying one or more anomalies in the filtered data set; and
- adjusting process parameters of the substrate processing apparatus, based on the one or more identified anomalies from the filtered data set.

16. The non-transitory computer readable medium of claim 15, further comprising:
- selecting a third data set corresponding to a third substrate processing metric monitored by a third sensor disposed in the substrate processing apparatus;
- selecting a fourth data set corresponding to a fourth substrate processing metric monitored by a fourth sensor disposed in the substrate processing apparatus;
- for each of the third and fourth data sets, generating a second reference correlation by selecting a subset of values in each data set;
- z-normalizing a difference of a second correlation to the second reference correlation;
- filtering a second z-normalized data set to remove one or more outliers from the second z-normalized data set to generate a second filtered data set;
- identifying one or more anomalies in the second filtered data set; and
- adjusting process parameters of the substrate processing apparatus, based on the one or more identified anomalies from the filtered data set.

17. The non-transitory computer readable medium of claim 15, wherein generating a reference correlation by selecting a subset of values in each data set, comprises:
- generating a reference correlation coefficient for substrate measurement in the first and second data set.

18. The non-transitory computer readable medium of claim 17, wherein generating a reference a reference correlation coefficient for substrate measurement in the first and second data set, comprises:
- selecting a first subset of substrate measurements in the first and second data sets;
- defining a first window of substrate measurements within the first subset of substrate measurements, wherein the first window of substrate measurements is smaller than the first subset of substrate measurements;
- generating a reference correlation coefficient for the first window of substrate measurements;
- shifting the first window of substrate measurements by an index to form a second window of substrate measurements; and
- generating a reference correlation coefficient for the second window of substrate measurements.

19. The non-transitory computer readable medium of claim 15, wherein z-normalizing a difference of a mean of the reference correlation to the reference correlation, comprises:
- comparing the remaining reference correlation outside of the subset of values to a reference correlation coefficient of the subset of values.

20. The non-transitory computer readable medium of claim 15, wherein filtering the z-normalized data set to remove one or more outliers from the z-normalized data set to generate a filtered data set, comprises:
- applying a Fourier transform, a band filter, and an inverse Fourier transform to the z-normalized data set.

* * * * *

UNITED STATES PATENT AND TRADEMARK OFFICE
CERTIFICATE OF CORRECTION

PATENT NO. : 10,503,144 B2  
APPLICATION NO. : 15/792436  
DATED : December 10, 2019  
INVENTOR(S) : Heng Hao et al.

It is certified that error appears in the above-identified patent and that said Letters Patent is hereby corrected as shown below:

On the Title Page

In item (54), in Column 1, in "Title", Line 2, delete "COEFFIECIENTS" and insert -- COEFFICIENTS --, therefor.

In the Specification

In Column 1, Line 2, delete "COEFFIECIENTS" and insert -- COEFFICIENTS --, therefor.

In Column 4, Line 43, delete "$S_1=\{x\},S_2=\{y_i\}$," and insert -- $S_1=\{x_i\},S_2=\{y_i\}$, --, therefor.

In Column 4, Line 63, delete "$\{\sigma_a \ldots \sigma_t\}$," and insert -- $\{\sigma_1 \ldots \sigma_t\}$, --, therefor.

In Column 6, Line 31, delete "$(Z_{diff}(r_i)$" and insert -- $(Z_{diff}(r_i)$ --, therefor.

Signed and Sealed this  
Twenty-fifth Day of February, 2020

Andrei Iancu  
*Director of the United States Patent and Trademark Office*